May 28, 1929.                E. McGEE                1,715,168
STOP COCK OR VALVE
Filed March 5, 1927
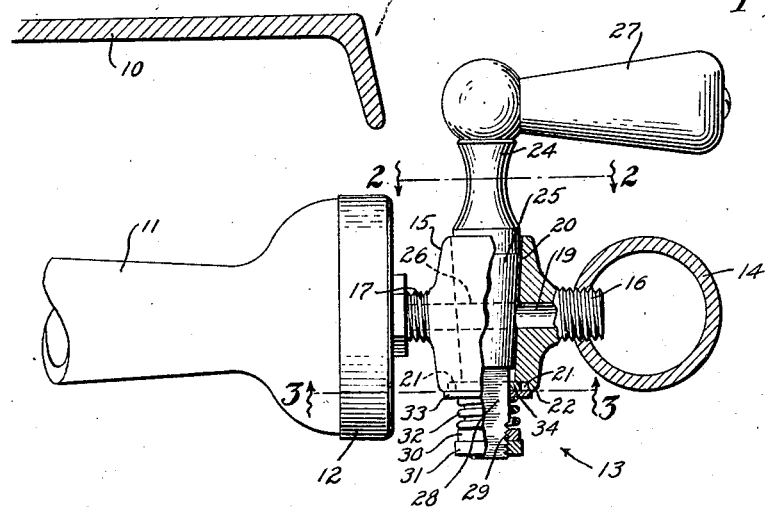
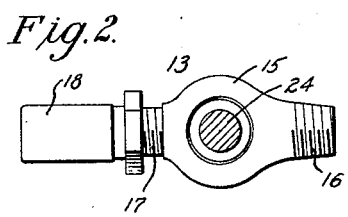
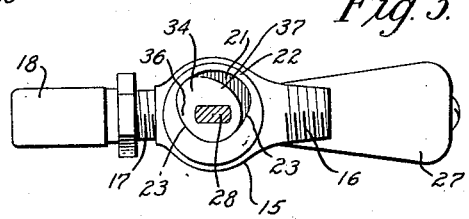
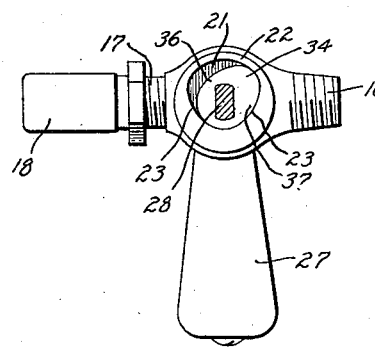
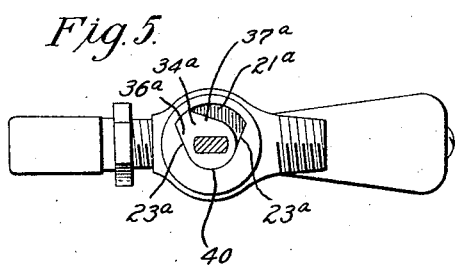
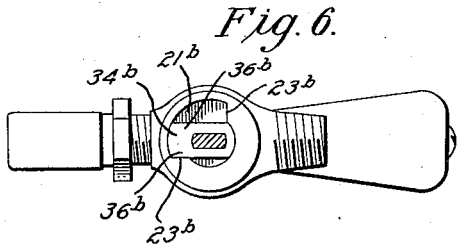
INVENTOR
Earl McGee
BY
Rogers Kennedy Campbell ATTORNEYS Patented May 28, 1929.

1,715,168

UNITED STATES PATENT OFFICE.

EARL McGEE, OF CATONSVILLE, MARYLAND, ASSIGNOR TO STANDARD GAS EQUIPMENT CORPORATION, A CORPORATION OF MARYLAND.

STOPCOCK OR VALVE.

Application filed March 5, 1927. Serial No. 173,007.

This invention relates to improvements in rotary plug valves, and is directed particularly to such valves, also known as stop cocks, for use with gas burners, in gas ranges and other environments.

It is desirable to limit the movements of valve plugs in valves of the above mentioned character, and this has usually been accomplished by providing the plugs with radial pins adapted to abut fixed stop shoulders on the valve bodies. Such arrangements have given rise to objections in that the pins become loose and drop out or become sheared off, leaving the device without stop means. The fixed stop shoulders have usually been provided by slots or notches in the casing walls, exposing the pins, and dirt settling on and adjacent to the stop shoulders and pins has tended to interfere with the proper operation of the valves and rendered them unsightly in appearance. Furthermore, it is necessary to provide such valves in right hand and left hand form, and in order to do this either the valve bodies or the valve plugs must be made in "rights" and "lefts", thereby increasing manufacturing costs.

The present invention overcomes the objectionable features of the prior art by providing a plug valve or stop cock with improved means for limiting the movement of the plug, and in which the stop means are reversible, whereby the parts may be assembled to form either a right hand or a left hand valve.

More specifically the invention contemplates a valve body or casing having a tapered valve seat, and a valve plug rotatable therein, said casing and plug being provided with mutually engaging stop members having extended complementary bearing surfaces. The casing is formed with a counterbore which is eccentrically disposed with reference to the tapered valve seat and preferably at the small end thereof, portions of the counterbore walls forming the fixed stops, and the valve plug carries a detachable washer which is in the counterbore and adapted to abut against said fixed stops to limit rotation of the plug. In one form of the invention the counterbore is defined by substantially merged curved walls of different radii so proportioned as to permit movement of the valve plug and stop washer through an arc of ninety degrees, and the edges of the stop washer are similarly curved to distribute the stresses incident to the abutment of the bearing surfaces. In two of the modifications illustrated, the bearing surfaces are relatively flat, and in each of the forms, the stop washer and the plug are held in their operative positions by a compression spring of the usual form. By inverting the stop washer with reference to the valve plug, the device may be changed from right hand to left hand, or vice versa, and the construction is so simple that it is well adapted for economical manufacture.

These and other features and advantages will be apparent from the following description, reference being had to the accompanying drawings wherein the invention has been shown by way of illustration, and wherein Figure 1 is an edge view, partly in section, of a stop cock embodying the invention and applied to a gas burner;

Fig. 2 is a transverse sectional view on line 2—2 of Fig. 1;

Fig. 3 is a transverse sectional view on line 3—3 of Fig. 1 showing the valve opened;

Fig. 4 is a view similar to Fig. 3 with the parts in closed position;

Figs. 5 and 6 are views similar to Fig. 3, and each showing a modified form of the invention.

Referring to Figures 1 to 4 inclusive, it will be seen that the improved valve illustrated is a gas cock and is shown in association with portions of a gas range, having the usual top 10, below which is the mixing tube 11 leading inwardly to a burner not shown. The outer end of the tube 11 is fitted with a usual primary air valve 12 and is supplied with gas through the improved valve 13 from a gas supply pipe or manifold 14.

The valve 13 comprises a casing 15 having at one side a threaded extension 16 for connection with the manifold 14, and at its opposite side a threaded extension or boss 17 to which is secured a nozzle 18. Extending longitudinally through the casing 15 and extensions 16 and 17 is a bore 19 constituting a fluid passage, and extending downwardly through the casing, intersecting the bore 19, is a tapered valve seat 20. The casing 15 is further characterized by a counterbore 21 which surrounds the small end of the tapered valve seat 20, and which is eccentrically disposed with reference thereto, and defined by a continuous and imperforate wall portion 22. The inner surface of the counterbore wall 22 is preferably symmetrical at opposite sides of the transverse center and comprises a plurality of substantially merged curves of different radii including relatively long bearing portions 23 which constitute fixed stops.

A valve plug 24 extends through the casing 15, it having a tapered barrel portion 25 seated snugly in the tapered valve seat 20, and through which is a transverse port 26 adapted to be selectively moved into or out of registration with the bore 19 by rotation of the valve plug. The upper end of the plug is provided with a handle 27 of any ordinary or preferred form, by which the valve may be opened or closed, and the lower end of the plug has a flattened portion 28 which extends through the counterbore and beyond the casing. The extremity of the portion 28 is screw threaded as at 29 for the accommodation of an adjusting nut 30 and a lock nut 31, and confined between the nut 30 and the lower end of the casing 15 is a compression spring 32, the inner or upper end of which bears against a thrust washer 33. From this it will be evident that the spring 32 maintains the valve plug in its seat so that it may be rotated without possibility of leakage.

In order to limit the rotation of the valve plug, a stop washer 34 is associated therewith, said stop washer being disposed within the counterbore 21 and preferably concealed by the thrust washer 33. As best shown in Figs. 3 and 4, the stop washer 34 is non-circular in outline, and is, in effect, a radial extension of the valve plug, it being rotatable therewith by virtue of the flattened portion 28 extending through a substantially rectangular aperture 35 in the stop washer. The opposite side edges 36 and 37 of the stop washer are curved in such a manner as to be complementary to the fixed stops 23, and the proportions of the parts are such that the stop washer permits movement of the valve plug through an arc of ninety degrees, from the open position as shown in Fig. 3 to the closed position in Fig. 4. The relatively long mutually engaging surfaces 23, 36, and 37 distribute the shocks, incident to the movement of the valve plug, over a substantial area, rendering the device exceptionally strong and durable, and there is no place for dirt to settle in such a manner as to interfere with the manipulation of the valve. The same parts may be used to produce either a right hand or a left hand valve by variation in the placing of the stop washer 34. For example, the valve shown in Fig. 3 may be changed to the opposite "hand" by removing the nuts 30 and 31, spring 32 and thrust washer 33, and then inverting the stop washer with reference to the valve plug. Said parts 30, 31, 32, and 33 may then be applied again, rendering the valve ready for use in such condition.

The valve shown in Fig. 5 is of the same general construction as the previously described embodiment, but has a differently shaped counterbore $21^a$ and stop washer $34^a$. Here the fixed stop portions $23^a$ of the casing are straight and diverging tangentially from an arcuate portion 40, and the side edges $36^a$ and $37^a$ of the stop washer are similarly straight, but converging in a direction away from the axis of the valve plug.

In Fig. 6 a further modification is shown, wherein the fixed stop portions $23^b$ of the counterbore $21^b$ are perpendicular to each other, and as a consequence, they are not as long as those of the previous forms. The side edges $36^b$ and $37^b$ of the stop washer $34^b$ are parallel to each other, and the illustrated arrangement is such that the stop washer $34^b$ is not reversible.

From the foregoing it will be evident that a so-called pinless cock has been produced, the construction being extremely simple, yet strong and dependable. Obviously, the invention is susceptible of further modifications in the details of construction and arrangement of parts, and the right is herein reserved to make such changes as fall within the scope of the appended claims without departing from the spirit of the invention.

Having thus described my invention, what I claim is:

1. A valve of the class described, comprising a valve casing having a tapered valve seat, and provided with an eccentrically disposed counterbore surrounding the small end of the tapered valve seat, said counterbore being defined by a continuous wall portion integral with the casing and having substantially merged curves of different radii, a tapered valve plug rotatable in said valve seat, an apertured stop washer detachably associated with the valve plug and disposed in said counterbore, said stop washer having extended edge portions with merged curves complementary to portions of said counterbore wall and adapted to abut against the same to limit the rotation of the plug, and a compression spring for maintaining the plug and the stop washer in operative positions in the casing.

2. A valve of the class described, comprising a valve casing having a tapered valve seat, and provided with an eccentrically disposed counterbore surrounding the small end of the tapered valve seat, said counterbore being defined by a continuous wall portion integral with the casing and having substantially merged curves of different radii, a tapered valve plug rotatable in said valve seat and having a flattened portion extending thru and beyond the counterbore, a stop washer detachably mounted on said flattened portion of the valve plug for rotation therewith in the counterbore, said stop washer having extended edge portions with merged curves complementary to portions of said counterbore wall and adapted to abut against the same to limit the rotation of the plug, a nut threaded on the outer projecting end of the flattened portion of the rotatable valve plug, and a compression spring encircling said flattened portion between the nut and the stop washer whereby to hold the plug in its seat and the stop washer in the counterbore.

In testimony whereof, I have affixed my signature hereto.

EARL McGEE.